United States Patent
Zmudzinski

(10) Patent No.: US 10,558,584 B2
(45) Date of Patent: Feb. 11, 2020

(54) EMPLOYING INTERMEDIARY STRUCTURES FOR FACILITATING ACCESS TO SECURE MEMORY

(71) Applicant: Intel Corporation, Santa Clara, CA (US)

(72) Inventor: Krystof Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 14/312,112

(22) Filed: Jun. 23, 2014

(65) Prior Publication Data

US 2015/0370628 A1 Dec. 24, 2015

(51) Int. Cl.
*G06F 12/14* (2006.01)
*G06F 12/08* (2016.01)
(Continued)

(52) U.S. Cl.
CPC .......... *G06F 12/14* (2013.01); *G06F 12/0815* (2013.01); *G06F 12/0882* (2013.01);
(Continued)

(58) Field of Classification Search
CPC .. G06F 11/1016; G06F 12/1009; G06F 12/12; G06F 12/0815; G06F 12/145;
(Continued)

(56) References Cited

U.S. PATENT DOCUMENTS 8,209,510 B1 6/2012 Thathapudi et al.
8,589,302 B2 * 11/2013 Prakash ................ G06F 21/572
705/50

(Continued)

FOREIGN PATENT DOCUMENTS

CN 101211318 A 7/2008
CN 101477492 A 7/2009
(Continued)

OTHER PUBLICATIONS

International Search Report and Written Opinion from related application PCT/US2015/030580 dated Jul. 29, 2015.
(Continued)

*Primary Examiner* — Reginald G Bragdon
*Assistant Examiner* — Aaron D Ho
(74) *Attorney, Agent, or Firm* — Grossman, Tucker, Perreault & Pfleger, PLLC

(57) ABSTRACT

The present application is directed to employing intermediary structures for facilitating access to secure memory. A secure driver (SD) may be loaded into the device to reserve a least a section of memory in the device as a secure page cache (SPC). The SPC may protect application data from being accessed by other active applications in the device. Potential race conditions may be avoided through the use of a linear address manager (LAM) that maps linear addresses (LAs) in an application page table (PT) to page slots in the SPC. The SD may also facilitate error handling in the device by reconfiguring VEs that would otherwise be ignored by the OS.

19 Claims, 8 Drawing Sheets

(51) Int. Cl.
*G06F 12/1009* (2016.01)
*G06F 12/12* (2016.01)
*G06F 12/0815* (2016.01)
*G06F 21/62* (2013.01)
*G06F 12/0882* (2016.01)
*G06F 12/121* (2016.01)
*G06F 21/60* (2013.01)

(52) U.S. Cl.
CPC .......... *G06F 12/1009* (2013.01); *G06F 12/12* (2013.01); *G06F 12/121* (2013.01); *G06F 12/145* (2013.01); *G06F 21/60* (2013.01); *G06F 21/62* (2013.01); *G06F 2212/1052* (2013.01); *G06F 2212/657* (2013.01)

(58) Field of Classification Search
CPC ........... G06F 2212/69; G06F 2212/657; G06F 2212/1052; G06F 12/14; G06F 21/62; G06F 9/45558; G06F 2009/4557; G06F 2009/45579; G06F 2009/45587; G06F 12/0882; G06F 12/121; G06F 21/60
USPC .................................. 711/206, 133
See application file for complete search history.

(56) References Cited

U.S. PATENT DOCUMENTS

2005/0114616 A1\* 5/2005 Tune ................... G06F 12/1441
711/163
2007/0214157 A1 9/2007 Kegeli
2009/0222816 A1 9/2009 Mansell et al.
2009/0249019 A1 10/2009 Wu et al.
2013/0132735 A1 5/2013 Kottilingal et al.
2013/0159726 A1\* 6/2013 McKeen ................. G06F 21/72
713/189
2013/0305342 A1 11/2013 Kottilingal et al.
2014/0258700 A1\* 9/2014 England ................ G06F 21/572
713/2
2014/0283056 A1\* 9/2014 Bachwani ............... G06F 21/56
726/23

FOREIGN PATENT DOCUMENTS

CN 106415574 A 2/2017
EP 1870814 A1 12/2007
KR 1020130001240 1/2013

OTHER PUBLICATIONS

International Preliminary Report on Patentability issued in PCT Application No. PCT/US2015/030580, dated Jan. 5, 2017, 7 pages.
Extended European Search Repost issued in European Application No. 15812717.5, dated Dec. 13, 2017, 6 pages.
Chinese Office Action received in Chinese Patent Application No. 201580026813.0, dated Sep. 25, 2018, 11 pages.
Chinese Office Action received in Chinese Patent Application No. 201580026813.0, dated May 8, 2019, with English translation.
Chinese Office Action received in Chinese Patent Application No. 201580026813.0, dated Sep. 29, 2019, with English translation.
European Examiner Report from related matter EP 15812717.5 dated Dec. 4, 2019.

\* cited by examiner

EMPLOYING INTERMEDIARY STRUCTURES FOR FACILITATING ACCESS TO SECURE MEMORY

TECHNICAL FIELD

The present disclosure relates to memory access transactions, and more particularly, to facilitating interaction between an operation system and secure regions of memory in a device.

BACKGROUND

The development of electronic technology has led to the proliferation and integration of various electronic devices in modern society. The functionality typically provided by stationary computing devices is now available in mobile and even handheld devices. This evolution has led to users becoming reliant upon their electronics for personal and/or business-related transactions. For example, users may interact with family, friends, business associates, clients, customers, etc., access financial records, conduct financial transactions such as transfers, purchases, etc., transmit data that may contain information of a sensitive and/or confidential nature (e.g., such as personal identification information, home or work contact information, account numbers, etc.), etc. Some of the information needed to perform the above activities may be stored on the user's device, and thus, may present an attractive target to those that may intend wrongdoing with such information. For example, unknown parties may attempt to access a device to obtain sensitive or confidential information about the user for use in the theft and/or misuse of the user's assets, identity theft, discrediting the user, learning the regular schedule and/or current whereabouts of the user, etc.

Various software solutions have been devised to prevent unauthorized access to devices. These software solutions are typically implemented at the same privilege level as the operating system of the device, and thus, may be vulnerable to attacks from malicious software (malware) on the device operating at a higher privilege level. As software developers attempt to strengthen their defenses against being compromised, attackers continue to devise means of compromising these defenses by introducing malicious code at lower levels within the operational hierarchy of the device. For example, malware such as rootkits may attack a device at a higher privilege level than existing malware detection and/or protection measures can accommodate. To combat this threat, equipment manufacturers are beginning to develop hardware-based protection schemes implemented at the lowest operational level/highest privilege level of a device. These protection measures may be designed to provide a secure operating environment in the device by deploying when device operations initiate. However, the integration of such low-level protection measures with existing/emerging operating systems may prove problematic without special provisions.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
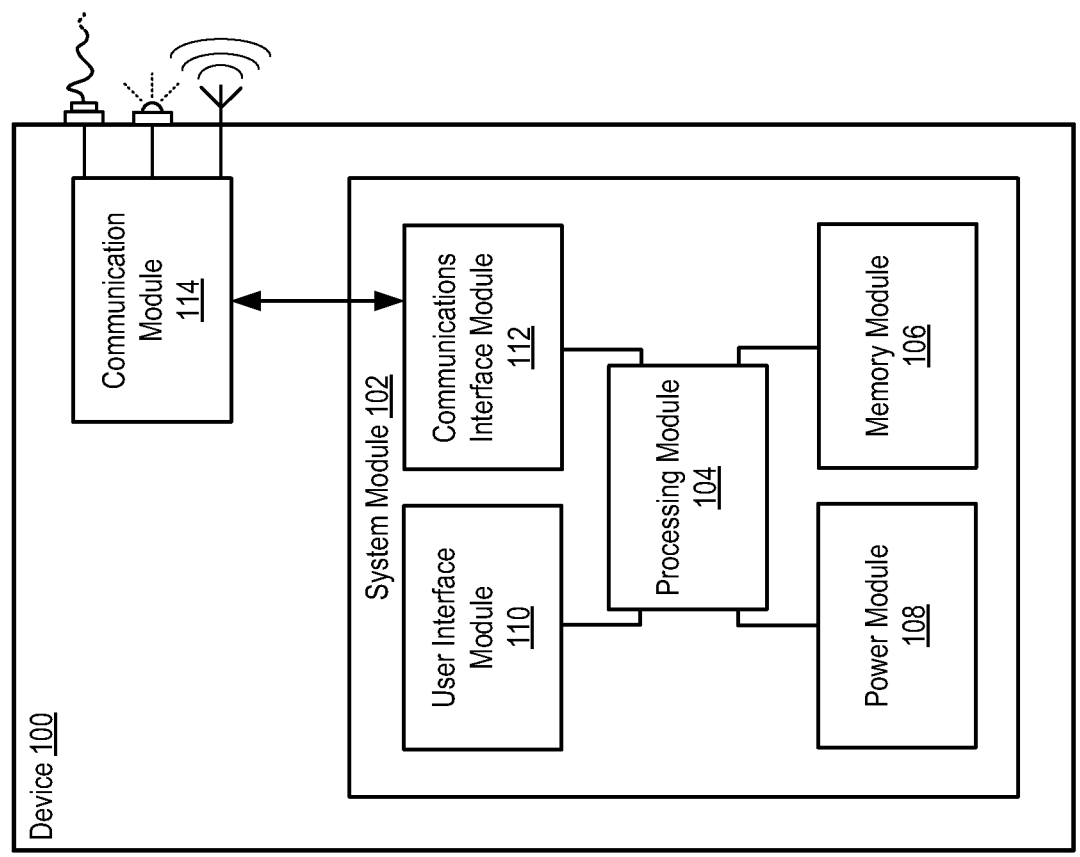
FIG. 1 illustrates an example configuration for a device usable in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to employing intermediary structures for facilitating access to secure memory. In one embodiment, hardware in a device (e.g., firmware) may load a secure driver (SD) into the device (e.g., upon activation). The SD may reserve a least a section of memory in a memory module of the device as a secure page cache (SPC). The SPC may be able to protect data corresponding to an application executing in the device from being accessed by other active applications (e.g., executing in the operating system (OS) of the device). For example, when an application is executing, linear addresses (LAs) in an application page table (PT) may typically point to the location of secure data pages in the SPC that may be required during execution of the program. However, consistent with the present disclosure, the linear addresses may actually be mapped to pseudo page addresses in a linear address manager (LAM), which may in turn be mapped to page slots in the SPC. The LAM may be interposed between the PT of the application and the SPC to simulate the SPC. In this manner race conditions may be avoided that could negatively impact device performance. Moreover, the SD may facilitate error handling in the device by reconfiguring virtual exceptions (#VEs) that would otherwise be ignored the OS. For example, the occurrence of a #VE may cause the SD to write an address to a control register to which the OS will react, while information about the actual cause of the #VE is stored elsewhere within a secure address space for later retrieval (e.g., when addressing the cause of the #VE).

In one embodiment, a device configured to employ intermediary structures for facilitating access to secure memory may comprise, for example, at least a memory module and a firmware module. The firmware module may be to cause at least one secure driver to be loaded into the memory module. The at least one secure driver may be to cause at least one section of memory in the memory module to be reserved as a secure page cache including at least one secure page slot and generate a linear address manager mapping at least one pseudo page address in the linear address manager to the at least one secure page slot.

In one embodiment, the memory module may further include, for example, an operating system in which applications execute, the execution of at least one application in the operating system causing data to be loaded into the secure page cache from elsewhere in the memory module. The application may comprise, for example, at least one page table including at least one linear address reserved by the secure driver for mapping to the at least one pseudo page address in the linear address manager. Consistent with the above example application, the secure driver may further be to release a linear address reserved by the secure driver for reassignment, map the linear address to a pseudo page address in the linear address manager and load an application page from the application into a secure page slot mapped to the pseudo page address, the application page becoming a secure page upon loading. As the application executes, the secure driver may further be to determine that a secure page loaded in a secure page slot is to be evicted from the secure page cache based at least on the receipt of a page fault, cause a pseudo page address corresponding to the secure page to be unmapped from the secure page slot in which the secure page is loaded and cause the secure page to be unloaded from the secure page slot. In addition, the secure driver may further be to cause a new application page to be loaded into the secure page slot, cause a new pseudo page address to be mapped to the secure page slot and cause a new linear address to be mapped to the new pseudo page address.

In the same or a different embodiment, the secure driver may further be to receive a virtual exception due to a page fault occurring in the secure page cache, reconfigure the virtual exception to be handled by the operating system and provide the reconfigured virtual exception to an operating system kernel. The secure driver being to reconfigure the virtual exception may comprise the secure driver being to push an error code on to an operating system call stack and write a linear address indicating that the virtual exception has occurred to a control register of the processing module to cause an operating system error handler to react to the virtual exception, the linear address indicating the virtual exception being within an address space of an application that caused the exception and outside of a secure address space within the memory module. Moreover, the secure driver may further be to write a linear address that caused the virtual exception to a register in the secure address space in the memory module. An example method consistent with the present disclosure may comprise causing at least one section of memory to be reserved as a secure page cache including at least one secure page slot and generating a linear address manager mapping at least one pseudo page address in the linear address manager to the at least one secure page slot.

FIG. 1 illustrates an example configuration for device 100 usable in accordance with at least one embodiment of the present disclosure. The various systems, components, methods, etc. disclosed herein may be applicable to a wide range of electronic devices. Device 100 may be, for example, a mobile communication device such as a cellular handset or a smartphone based on the Android® OS from the Google Corporation, iOS® from the Apple Corporation, Windows® OS from the Microsoft Corporation, Mac OS from the Apple Corporation, Tizen OS from the Linux Foundation, Firefox OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Regardless, device 100 has been provided only as a general example of an apparatus on which embodiments consistent with the present disclosure may be configured, and is not meant to limit these various embodiments to any particular manner of implementation.

Device 100 may comprise, for example, system module 102 configured to manage device operations. System module 102 may include, for example, processing module 104, memory module 106, power module 108, user interface module 110 and communication interface module 112. Device 100 may also include communication module 114. While communication module 114 has been shown as separate from system module 200, the example implementation disclosed in FIG. 1 has been provided merely for the sake of explanation. Some or all of the functionality associated with communication module 114 may be incorporated into system module 102.

In device 100, processing module 104 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing module 104 may interact with other system components that may be operating at different speeds, on different buses, etc. in device 100. Some or all of the functionality commonly associated with the support circuitry may also be included in the same physical package as the processor (e.g., such as in the Sandy Bridge family of processors available from the Intel Corporation).

Processing module 104 may be configured to execute various instructions in device 100. Instructions may include program code configured to cause processing module 104 to perform activities related to reading data, writing data, processing data, formulating data, converting data, transforming data, etc. Information (e.g., instructions, data, etc.) may be stored in memory module 106. Memory module 106 may comprise random access memory (RAM) or read-only memory (ROM) in a fixed or removable format. RAM may include volatile memory configured to hold information during the operation of device 100 such as, for example, static RAM (SRAM) or Dynamic RAM (DRAM). ROM may include non-volatile (NV) memory modules configured based on BIOS, UEFI, etc. to provide instructions when device 100 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 108 may include internal power sources (e.g., a battery, fuel cell, etc.) and/or external power sources (e.g., electromechanical or solar generator, power grid, fuel cell, etc.), and related circuitry configured to supply device 100 with the power needed to operate. User interface module 110 may include hardware and/or software to allow users to interact with device 100 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 110 may be incorporated within device 100 and/or may be coupled to device 100 via a wired or wireless communication medium.

Communication interface module 112 may be configured to manage packet routing and other control functions for communication module 114, which may include resources configured to support wired and/or wireless communications. In some instances, device 100 may comprise more than one communication module 114 (e.g., including separate physical interface modules for wired protocols and/or wireless radios) all managed by a centralized communication interface module 112. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 112 may be configured to prevent wireless communications that are active in communication module 114 from interfering with each other. In performing this function, communication interface module 112 may schedule activities for communication module 114 based on, for example, the relative priority of messages awaiting transmission. While the embodiment disclosed in FIG. 1 illustrates communication interface module 112 being separate from communication module 114, it may also be possible for the functionality of communication interface module 112 and communication module 114 to be incorporated within the same module.

Figure 2:
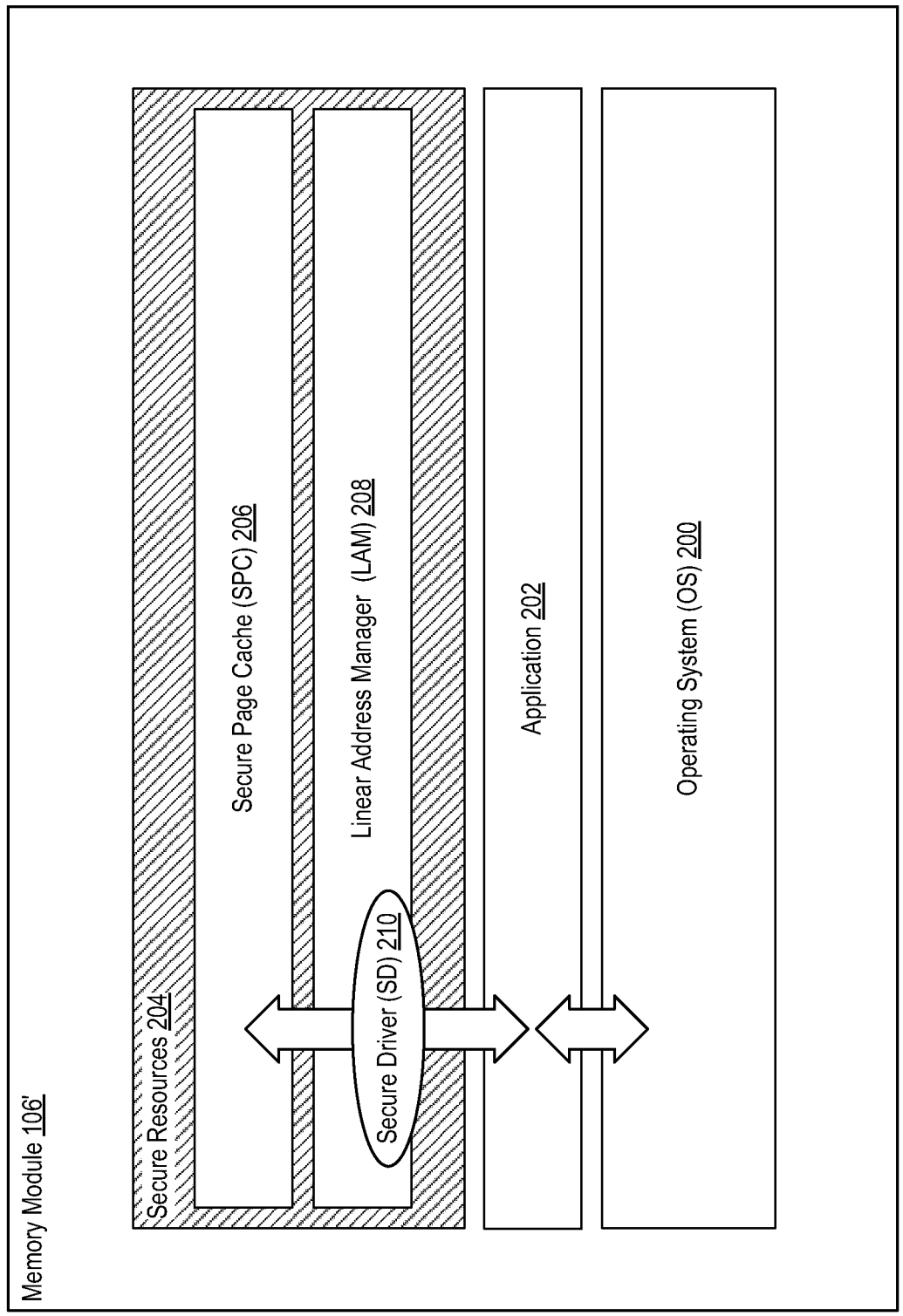
FIG. 2 illustrates an example memory module employing intermediary structures for facilitating access to secure memory in accordance with at least one embodiment of the present disclosure.

FIG. 2 illustrates example memory module 106' employing intermediary structures for facilitating access to secure memory in accordance with at least one embodiment of the present disclosure. Initially, various embodiments disclosed herein will be described using terminology that may be commonly associated with certain equipment manufacturers (e.g., Intel Corporation) and/or software providers (e.g., Microsoft Corporation). The use of this terminology is merely to convey important concepts in a readily comprehensible context, and is not intended to limit any implementation consistent with the present disclosure to particular equipment and/or software.

In general, various embodiments consistent with the present disclosure may allow for the implementation of a hardware-based memory protection scheme in a device that may include an OS that is not directly compatible with the protection scheme. More specifically, the protection scheme may require certain interfaces and/or interaction with the OS that may not be supported by all types and/or versions of OS. Embodiments consistent with the present disclosure may be able to account for the lack of direct support from an OS when implementing memory protection.

An example implementation of memory module 106' may comprise, for example, at least OS 200, application 202 and secure resources 204. Secure resources 204 may comprise at least SPC 206 and LAM 208. From a communication standpoint, SD 210 may facilitate interaction between Application 202, LAM 208 and SPC 206 in secure resources 204. To react to a #VE, SD 210 may reconfigure the #VE so that it may be recognized by OS 200, which hands off the #VE to application 202, which routes the #VE to SD 210 for handling the cause of the exception.

OS 200 may comprise, for example, at least one software program configured to manage the operation of equipment comprising computing functionality. Examples of OS 200 have been set forth above. In many instances, features associated with the Windows OS will be referenced merely for the sake of explanation herein. Secure resources 204 may include a hardware-based protection scheme such as Software Guard Extensions (SGX) designed by the Intel Corporation. SGX includes a set of new instructions and memory access changes embedded in the architecture of certain Intel® processors and chipsets. These extensions allow application 202 to instantiate a protected container, or "enclave," which may be an area within the address space of application 202 providing confidentiality, integrity, etc., even in the presence of highly privileged malware. Attempted access to an enclave from software not resident in the enclave is prevented even from privileged software such as virtual machine monitors, BIOS, components of OS 200, etc.

SGX architecture comprises new instructions, new processor structures and a new mode of execution. These include, for example, loading an enclave into protected memory, access to resources via PT mapping and scheduling the execution of enclave-enabled application 202. Thus, OS 200 still maintains control as to what resources an enclave can access. SGX operations may be categorized into the following functions: enclave build/teardown, enclave entry/exit, enclave security operations, paging instructions, and debug instructions. Instructions that may be used to allocate protected memory for the enclave, load values into the protected memory, measure (e.g., verifying a hash value of a program's code against the hash value of a known good version of the program) software loaded into the enclave's protected memory and teardown the enclave after application 202 has completed are as follows: "ECREATE" may declare base and range, and may initiate a build, "EADD" may add a 4K page to the enclave, "EEXTEND" may measure 256 bytes, "EINIT" may declare an enclave built and "EREMOVE" may remove a page from the enclave. These instructions may be executed by SD 210 (e.g., ring-0 software typically referred to as the SGX driver). SD 210 may be loaded into device 100 by, for example, firmware within memory module 106. In one embodiment, the firmware may load SD 210 when device 100 is activated (e.g., from a cold boot, rebooted, etc.). In one embodiment, SD 210 may be measured by a previously loaded/measured program, the measurement of a subsequently loaded program by a measured program also being known as establishing a "Chain of Trust" in device 200.

Other instructions may be used to enter and exit the enclave. An enclave can be entered using "EENTER," and exited using "EEXIT," explicitly. It may also be exited asynchronously using "AEX" due to interrupts or exceptions. In the instance of AEX the hardware may save all secrets inside the enclave, scrub secrets from registers, and return to external program flow. Application 202 may then resume where it left off execution. Instructions that may allow OS 200 to securely move enclave pages to and from unprotected memory may include, for example, "EPA" to create a version array page, "ELDB/U" to load an evicted page into protected memory, "EWB" to evict a protected page, as well as "EBLOCK" and "ETRACK" to prepare for eviction.

In general, secure resources 204 may include instructions that the SD 210 can execute to implement paging of secure pages loaded into SPC 206. While the protection provided by secure resources 204 may enable application 202 to execute with confidentiality, integrity etc., paging secure pages loaded into SPC 206 may have certain requirements. Using SGX as an example, it is required that OS 200 offer a particular memory management application program interface (API) and is capable of a special handling of SPC memory access faults. Most modern operating systems feature some kind of Structured Exception Handling (SEH) mechanism. SEH enables applications to handle hardware and software exceptions. Memory access exceptions typically result in page faults (#PF) that are handled by OS 200 first. However, if OS 200 can't deal with a particular #PF it may hand it to application 202 that caused the #PF in the first place through the SEH mechanism. The second requirement for SPC paging may be a memory management API that allows for reservation of LA of secure pages that are not currently loaded in SPC 206. Such an API would allow for the un-mapping of secure LAs (SLAs) from the physical address of the pages (SPs) of SPC 206 while, at the same time, reserving those addresses until evicted enclave pages are again loaded into SPC 206. Unfortunately, the above error handling and API features are unavailable in most, if not all, of the commonly available operating systems.

Figure 3:
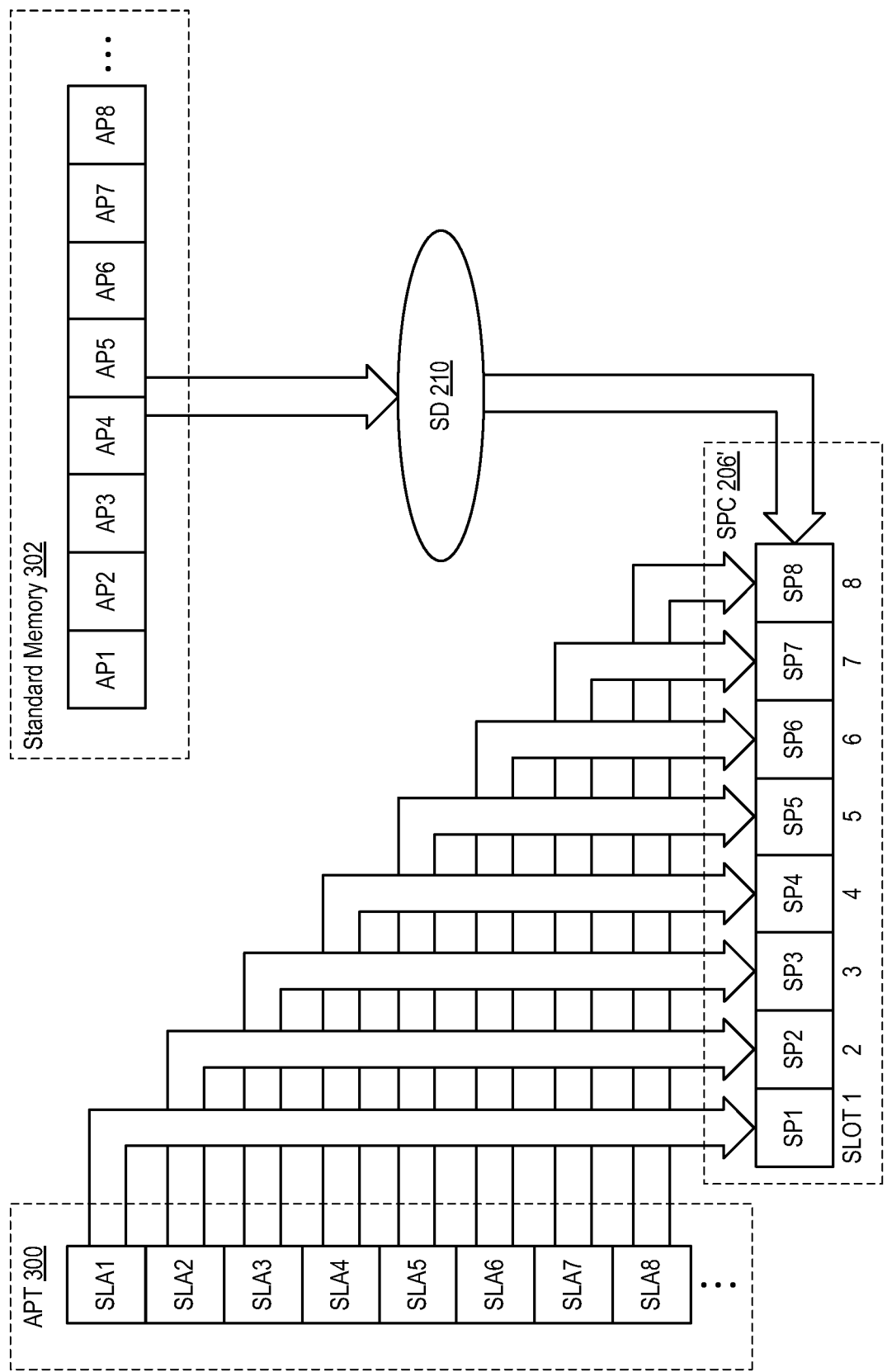
FIG. 3 illustrates an example of memory mapping between an application and a secure memory in accordance with at least one embodiment of the present disclosure.

FIG. 3 illustrates an example of memory mapping between an application and a secure memory in accordance with at least one embodiment of the present disclosure. Assuming that SD 210 is loaded and operational, application 202 may cause SPC 206 to be loaded by executing a series of Input and Output Control (IOCTL) calls to the SD 210. Using SGX as an example, in addition to ECREATE and EADD IOCTLs, application 202 may also execute EEXTEND and EINIT IOCTLs while SPC 206 is being loaded. EEXTEND IOCTLs may be executed multiple times for each loaded secure page to measure SPC 206 during loading and EINIT IOCTL may be executed once at the end to pass the final measurement to the hardware for verification. The various measurement and verification operations that may occur during the loading of SPC 206 have been omitted from FIG. 2 for clarity. While they may occur in due course, their operation is not relevant to the embodiments disclosed herein. The first IOCTL (e.g., ECREATE_IOCTL) signals that SPC 206 is about to be loaded. Based on arguments that application 202 may pass as part of the ECREATE_IOCTL call, SD 210 may reserve a region of application virtual memory to be later mapped to the physical addresses (e.g., also called SPC slots) where the SPC 206 will be loaded.

FIG. 3 illustrates eight application pages AP1, AP2, AP3, AP4, AP5, AP6, AP7 and AP8 (e.g., collectively "SP 1-8") belonging to application 202 residing in standard memory 302 (e.g., other memory space in memory module 106). The IOCTL calls may then be made, loading AP 1-8 into an empty SPC 206' with eight available slots including slot 1, slot 2, slot 3, slot 4, slot 5, slot 6, slot 7 and slot 8 (collectively "SLOTS 1-8"). Following loading into SLOTS 1-8, AP 1-8 may become secure pages SP1, SP2, SP3, SP4, SP5, SP6, SP7 and SP8 (collectively "SP 1-8"). At least one page table belonging to the process of application 202 (e.g., APT 300) may comprise eight page frames SLA1, SLA2, SLA3, SLA4, SLA5, SLAG, SLAT and SLA8 (e.g., collectively SLA 1-8) after OS 200 grants the request to reserve a virtual address space region for SPC 206' being loaded. At this point, some internal data structures have been allocated and the SD 210 may be ready to load the AP 1-8 into available SPC slots as soon as application 202 issues the EADD_IOCTL instruction. After application 202 executes the first EADD_IOCTL30 request, SD 210 may execute a two-part memory remap request. The first part may free an LA (e.g., SLA 1) so it may be mapped to a corresponding physical address space (e.g., SLOT 1) in the next part. Following mapping of an SLA to a physical address space, the corresponding application page (e.g., AP1) may then be loaded into the physical address space (e.g., SLOT 1), the application page then becoming a secure page (e.g., SP1). This process may be repeated until SLA 1-8 are mapped to SLOTS 1-8, into which SP 1-8 are loaded, respectively. The above two-part memory remap request may be subject to a race condition. In a scenario when application 202 requests a memory allocation on another thread, OS 200 could grant the allocation request and use the newly freed LA before the second part is completed by SD 210. Should that occur, the SD 210 would have to abort and the whole build process would have to start anew.

Figure 4:
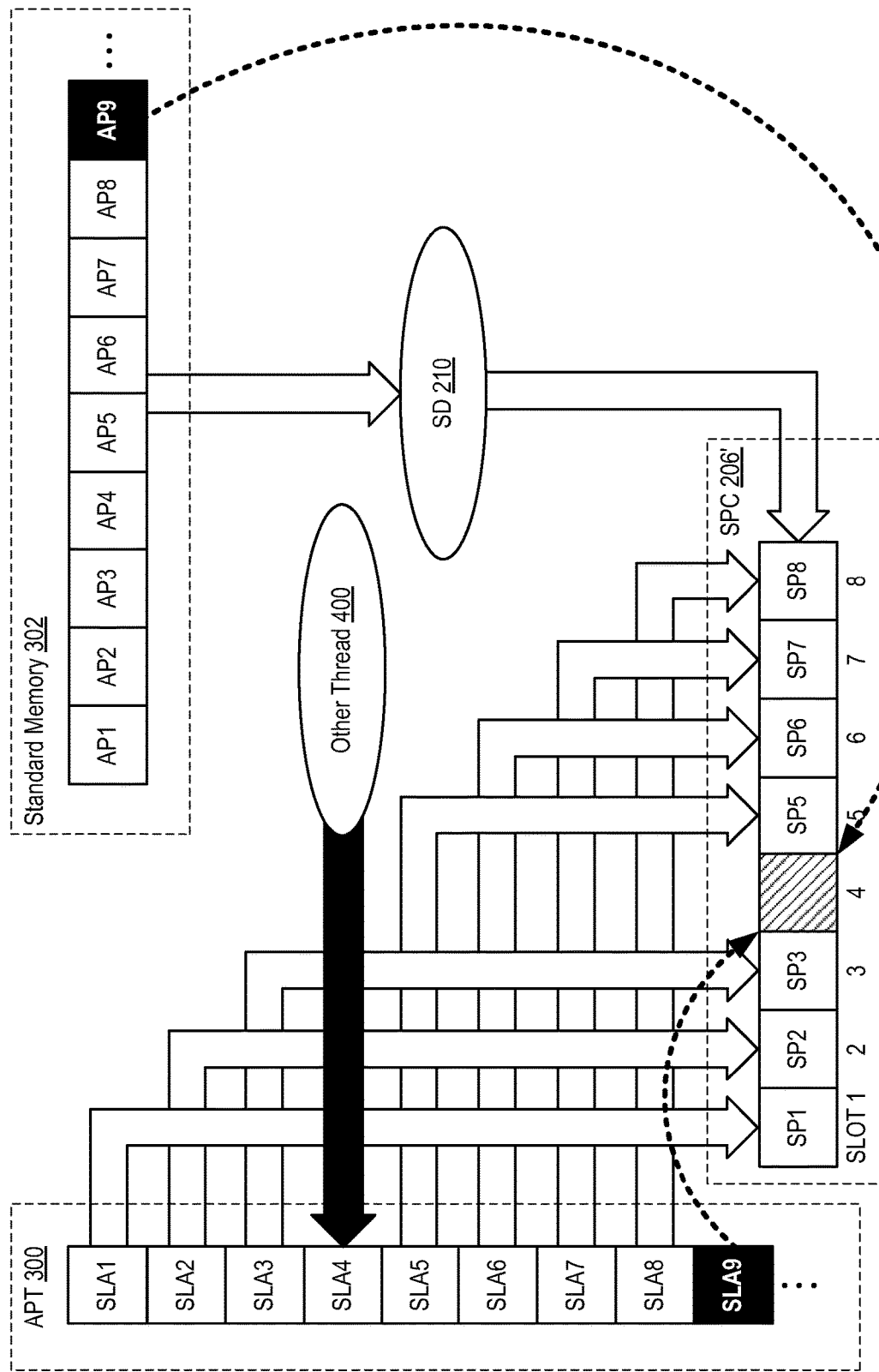
FIG. 4 illustrates an example of a timing issue when evicting a secure page from a slot in a secure page cache in accordance with at least one embodiment of the present disclosure.

FIG. 4 illustrates an example of a timing issue when evicting a secure page from a slot in a secure page cache in accordance with at least one embodiment of the present disclosure. While the race condition disclosed above may be unlikely, a much more complicated case can arise in a situation when an SP 1-8 has to be evicted from the SPC 206'. SD 210 must be able to handle situations when the size of individual enclaves, or the total size of all loaded enclaves, exceeds the size of SPC 206. For example, when SGX is employed SD 210 may employ SGX paging instructions to evict at least one SP 1-8 (e.g., also known as "victim pages") from SPC 210 so that new application pages (e.g., also known as "target pages") may be loaded into SPC 210.

Given that, for example, that SGX is being utilized and OS 200 is Windows, SD 210 must utilize the Windows memory address space management API to load application pages and to implement an enclave page cache (EPC) paging scheme. For example, prior to SGX being enabled in device 100 (e.g., in the early stages of the system boot), special range registers called processor reserved memory range registers (PRMRRs) may be disabled. EPC may be a part of PRM, and for the purpose of the present disclosure it may be assumed that PRM is in fact EPC. As far as OS 200 is concerned, the mappings between LAs and physical address in application PTs are exactly the same whether they refer to regular physical memory or EPC memory. The CPU may enforce that LAs mapped to physical addresses within the EPC can only be accessed in the special SGX mode (e.g., just as the SMRAM may only be accessed in SMI mode.) If not accessed in SGX mode, they have the same behavior as so called abort page accesses; writes are silently dropped and reads return "−1."

There are two classes of API that may be important. The first class allocates and frees application virtual address space. For example, the "ZwAllocateVirtualMemory" routine may reserve and/or commit a region of pages within the user-mode virtual address space of a specified process while the "ZwFreeVirtualMemory" routine may release and/or decommit a region of pages within the virtual address space of a specified process. The second class of API including the routines "ZwMapViewOfSection" and "ZwUnmapViewOfSection" may map physical addresses (e.g., called section views) into the LA space and may unmap such section views from LAs. When SD 210 needs to load another enclave page (e.g., SP9) to an already full EPC (e.g., either through EADD or one of the ELD instructions) it may first identify/evict a victim page (e.g., SP4) using a sequence of EBLOCK, ETRACK and EWB instructions (e.g., hereafter "EWB"). After SD 210 evicts the victim page via EWB (e.g., leaving slot 4 in SPC 206' available for new SP 9), the LA of the evicted page (e.g., SLA4) may then be unmapped using the ZwUnmapViewOfSection routine and may reserve that virtual address (e.g., using the ZwAllocateVirtualMemory routine) in the instance the evicted page needs to be reloaded later. This two-part process may be called "parking" the LA. However, the virtual memory remapping process can fail due to a race condition whereby another thread 400 from application 202 may request to allocate some virtual memory, which may result in OS 200 reusing the newly freed LA SLA4 to fulfill the request. At this point SD 210 can't recover the linear address. It returns an error code to application 202 and destroys the enclave.

Figure 5:
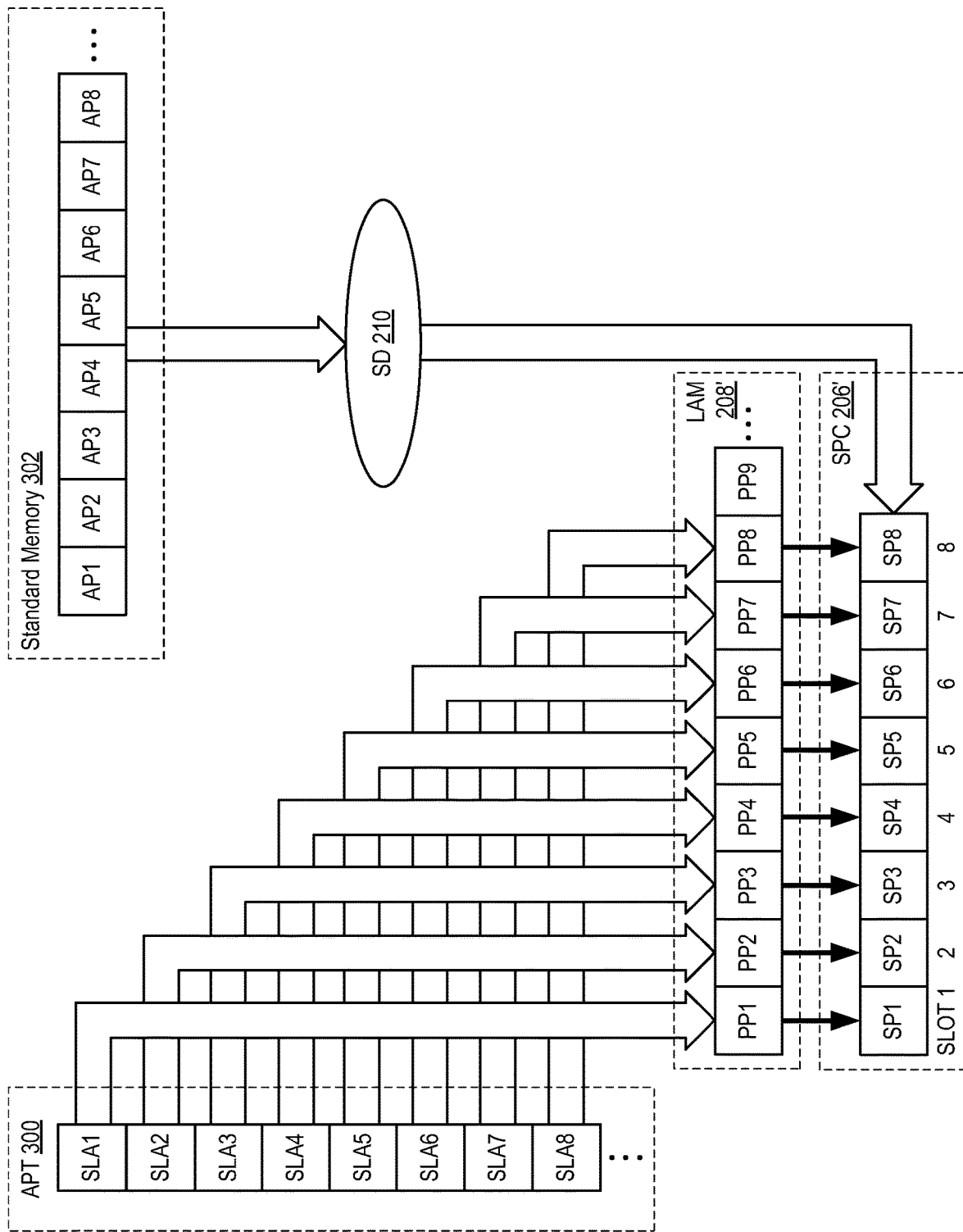
FIG. 5 illustrates an example of an intermediary structure to avoid timing possible issues in accordance with at least one embodiment of the present disclosure.

FIG. 5 illustrates an example of an intermediary structure to avoid timing possible issues in accordance with at least one embodiment of the present disclosure. In at least one example implementation, the Intel architecture may allow OS 200 to maintain PTs that translate LAs into physical addresses, and #PFs may be delivered through the Interrupt Descriptor Table (IDT) to the appropriate OS handler. When virtualization turns on Extended Page Tables (EPTs), an additional layer of address translation is introduced by software operating in VMX-root mode (e.g., host mode) called a hypervisor. A virtual machine (VM) containing OS 200 is "hosted" as a guest, so the OS-maintained linear and physical addresses are now called guest linear addresses (GLA) and guest physical addresses (GPA), respectively. EPTs may translate from GPAs to host physical addresses (HPA), and access faults called EPT violations may be delivered to the hypervisor via a VM-exit. The hypervisor can convert EPT violations to guest page faults.

The limitations evident in the Windows memory address space management API may be remedied by permanently mapping enclave linear address space creating GLA→GPA mappings that never change. Such mappings would be created before SD 210 executes the ECREATE instruction and may not be released until the last enclave page was removed from SPC 206'. In other words the enclave linear address space would be permanently parked. At the same time, to enable access faults for evicted enclave pages, an additional level of address translation can be added using EPTs. EPTs may map GPAs of such parking space (e.g., LAM 208') to HPAs of the actual EPC. GPA→HPA mappings for secure pages evicted from SPC 206' would be marked not present in EPTs. Also, mappings for available slots in LAM 208' would be marked not present. Access to such pages would engender EPT violations that the hypervisor would convert to #PFs. The setup of LAM 208' may require only a very minimalistic VT hypervisor that doesn't have to be a full-blown VMM. It may assume there is only one guest and that no hardware resources have to be virtualized. The hypervisor has to create EPTs that map LAM 208' into GPA space. The guest (e.g., OS 200) may, for example, discover this additional "memory" through a new CPUID 0x12 leaf. It is important to note that this design will limit the total size of enclaves that can be "loaded" into LAM 208' at any given time. That size may depend on the size of LAM 208' mapped into GPA space. However, even in SGX (e.g., with the required OS support for EPC paging) that size may still be limited by the amount of physical memory that OS 200 is willing to page to disk so this point can be neglected for now.

For example, SD 210 may execute a new leaf of CPUID 0x12 to discover where in the GPA space LAM 208' is located and how big it is. SD 210 may then map LAs of enclave pages (e.g., SLA 1-8) to pseudo page addresses PP1, PP2, PP3, PP4, PP5, PP6, PP7, PP8 and PP9 (e.g., collectively PP 1-9) of LAM 208' using application PTs as SPC 206' is loaded. For SP 1-8 loaded into SPC 206', SD 210 may change the mappings in the EPTs so PP 1-9 are mapped to Slots 1-8. For any SP1-8 that is evicted from SPC 206' the mappings may indicate that (e.g., be marked as) the evicted SP 1-8 is not present. When any SP 1-8 that is evicted from SPC 206' is accessed, EPT violations may be generated by processing module 104. An EPT violation can be delivered only to the hypervisor via a VM exit. Since the hypervisor is not involved in the EPC management, it may convert EPT violations to #PFs by, for example, manipulating the guest's virtual machine control structure (VMCS). #PFs are delivered to the SGX driver through the structured exception handling. The driver finds victim pages and evicts them from EPC and loads the missing pages into EPC. When the victim pages are evicted, the driver marks the corresponding mappings in EPTs as not present and invalidates them. When the missing pages are loaded into EPC, the driver updates the corresponding EPT mappings with the new EPC HPA and marks them as present. The mappings in application PTs for any enclave pages involved in this process do not change.

Figure 6:
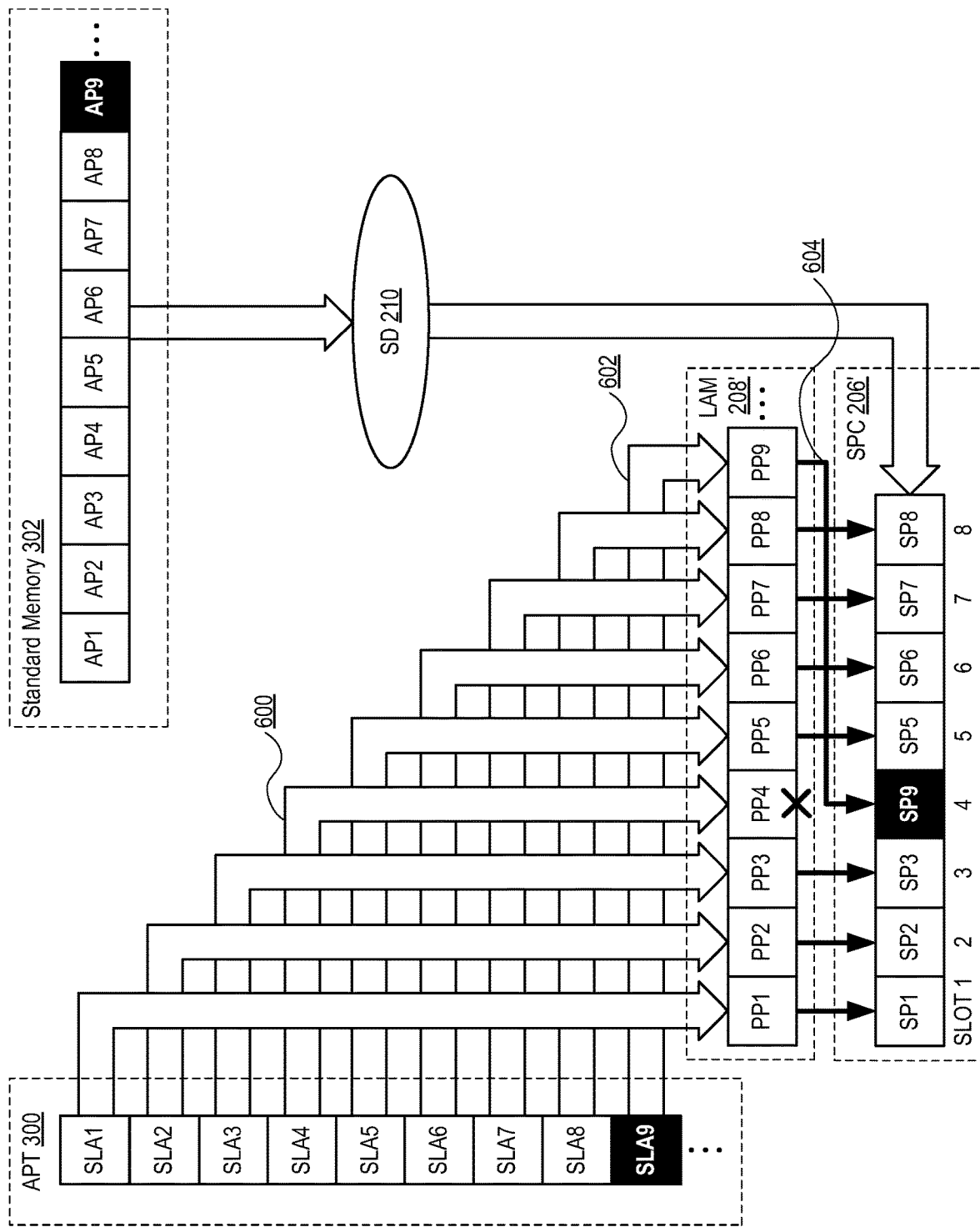
FIG. 6 illustrates an example operation wherein a secure page is evicted from a slot in a secure cache using an intermediary structure in accordance with at least one embodiment of the present disclosure.

FIG. 6 illustrates an example operation wherein a secure page is evicted from a slot in a secure cache using an intermediary structure in accordance with at least one embodiment of the present disclosure. FIG. 6 illustrates how SLAs 1-8 are mapped to EPC through FEPC using APT 300 and EPTs. It also shows that SLAs 1-8 are never remapped while enclave pages are evicted from EPC and loaded back into EPC. In the example depicted in FIG. 6, SP4 is evicted from SPC 206' to make room for the SP9. New LA SLA9 may then be mapped to PP9, which may be mapped to slot 4 containing SP9. However, SLA4 remains reserved (e.g., mapped to PP4) so it can't be reused by OS 200 when another thread in application 202 requests a LA for the newly allocated memory. When access to SP4 through SLA4 is attempted, an access fault may result because the EPT mapping between LAM 208' and SPC 206' is not present. SD 210 may then receive the fault as a #PF and may evict another SP to free up room to reload SP4. If other thread 400 (e.g., from FIG. 5) would happen to request some memory from the heap, OS 200 may then be forced to use an SLA that resides outside of SPC 206'.

Implementing systems such as disclosed above is not without challenges to overcome. Proof-of-Concept (PoC) testing (e.g., utilizing Intel equipment and a Microsoft Windows OS) has demonstrated that reserving the SLAs prior to issuing an ECREATE instruction may be very wasteful because SPC 206' may be very sparse. Moreover, reserving the declared LA space by mapping LAM 208' in EPTs may unnecessarily waste EPT entries for LAM 208', and any attempt to reclaim those wasted entries after the last EADD may add a performance penalty and unnecessary code complexity to SD 210. To account for these issues, the PoC was mapped SLAs to GPAs in LAM 208' prior to each EADD. This workaround was deemed acceptable as long as other threads did not attempt to allocate memory that could result in the race condition described above. More importantly, EPT violations converted to #PFs based on the actual faulting GLAs may be ignored by OS 200 as spurious because the GLA→GPA mappings they refer to may be considered "valid" as far as OS 200 is concerned. Adding the performance penalty of VM exits required for such conversion, a better solution has to be used. Lastly, as GPAs in LAM 208' are mapped to HPAs in SPC 106' when an SP is loaded into a slot in SPC 206'or invalidated when an SP is evicted, the GPA→HPA these mappings have to be updated. Normally, this is done in a hypervisor because the INVEPT instruction used to invalidate cached EPT mappings can only be executed in the VMX-root mode. Since only SD 210 knows which mappings to change and how, a VMCALL instruction is needed to communicate this knowledge to the hypervisor. VMCALLs cause VM exits into the hypervisor, which may be an expensive proposition at least from a data processing performance standpoint.

A remedy for the above performance concerns may be found in some Intel processors and chipsets operating in conjunction with a Windows OS. For example, Virtual Technology (VT) architecture (e.g., available in certain products from the Intel corporation) may comprise special extensions that facilitate performance improvements for view management and are enabled with EPTs while in VMX-root operation. At least one special extension may include a feature called EPT pointer (EPTP) switching that allows the guest software to switch between different EPT hierarchies called views. EPTP introduces the ability for EPT violations to be mutated into a new exception type called virtualization exception (#VE, vector 20) which OS 200 can handle as it has the same semantics as a #PF. This provides OS 200 with the ability to detect and/or respond to EPT violations with the latency of exception handling as opposed to accruing VM-exit latencies before reaching the view management logic. EPTP switching may be based on EPT structure hierarchies, each describing exclusive memory region. An EPTP List is a page-size data structure with up to 512 EPTPs that point to first-level (PML4) EPT pages, which in turn point to different EPT hierarchies. The EPT hierarchies may define memory views that share some parts of GPA space between them. A PML4.0 view is often called the default view. Guest software can switch between EPT views by executing the VMFUNC instruction with the first argument passed in the EAX register set to 0 and the second argument passed in the ECX register set to the view number. In order to move from one memory view to another without incurring a VM-exit, the VMFUNC-calling page in the active, source memory view must share that page with the destination memory view.

In x64 editions of Windows, Microsoft chose to begin to enforce what system structures drivers can and cannot modify. Kernel Patch Protection (KPP), or "PatchGuard" as it is known informally, is the technology that enforces the restrictions. PatchGuard may periodically verify that protected system structures in the kernel have not been modified. If a modification is detected, Windows may initiate a bug check and shut down the system with a blue screen and/or reboot. The corresponding bug check number is 0x109 and the bug check code is CRITICAL_STRUCTURE_CORRUPTION. Prohibited modifications may include: modifying system service tables, modifying the interrupt descriptor table, modifying the global descriptor table, using kernel stacks not allocated by the kernel, modifying or patching code contained within the kernel itself or the HAL or NDIS kernel libraries, etc.

By employing BP extensions, the design of LAM 208' can be improved significantly. However additional changes to the hypervisor may be required. The hypervisor may enable EPTP switching and the mutation of EPT violations into #VEs by manipulating various gust controls to allow the SD 210 to change the EPT mappings for LAM 208' directly and securely. The hypervisor may map last-level EPTs that contain GPA→HPA mappings between LAM 208' and SPC 206' into the GPA space. To protect those mappings from attacks, the hypervisor may create a special EPT view that is identical to the default EPT view except that all pages are mapped with read-write access permissions only. This prevents any code in the default view from accessing the EPT pages for LAM 208' by default. The view contains EPT pages of LAM 208' mapped into the GPA space with read-write access permissions. The hypervisor may also add a VMCALL that allows SD 210 to add more pages to that view with read-write-execute access permissions. SD 210 may use the VMCALL to add code pages that switch between the default view and the view containing EPTs of LAM 208' and to manipulate these EPT mappings.

For example, an EPT view (e.g., PML4.511) for LAM 208' may be generated by the hypervisor including two code pages from the #PF handler that SD 210 may use to switch to the PML4.511 view, quickly access and edit EPT mappings for LAM 208', and switch back to the default view. SD 210 may still need to execute a VMCALL if it wants to invalidate cached FEPC EPT mappings for enclave pages evicted from EPC because only software in VMX-root mode can execute the INVEPT instruction. However, a "special trick" may be employed to invalidate EPT mappings by executing the VM function 0.

EPT mappings may be tagged with Address Space Identifiers (ASID) that, together with the actual GPA→HPA mapping, make them unique across all views. The maximum number of EPT views for any processor is 512 (e.g., a memory page is 4096 bytes and one EPTP record is eight bytes, so there are 4096/8 records). There is only one EPTP List page per CPU core. Thus, it is possible to generate up to 511 EPTP views that are exactly the same, plus a 512th view that allows the driver to edit the leaf EPTs that map LAM 208' to the SPC 206' (e.g., assuming the number of ASIDs will never exceed 512). For example, the hypervisor may generate copies of the default PML4 EPT page and populate the EPTP list with EPTPs pointing to the copies. SD 210 may execute VMFUNC (0, index), where the index may increase from 0 to 511 and then back to 0, whenever stale EPT mappings for LAM 208' are to be invalidated. In an example of operation, a CPU may use four ASIDs, so the hypervisor may create five default views. SD 210 may then rotate through views PML4.0 to PML4.4 and back to PML4.0. The PML4.511 view may still be reserved for EPTs in LAM 208' and the code that manipulates them.

Figure 7:
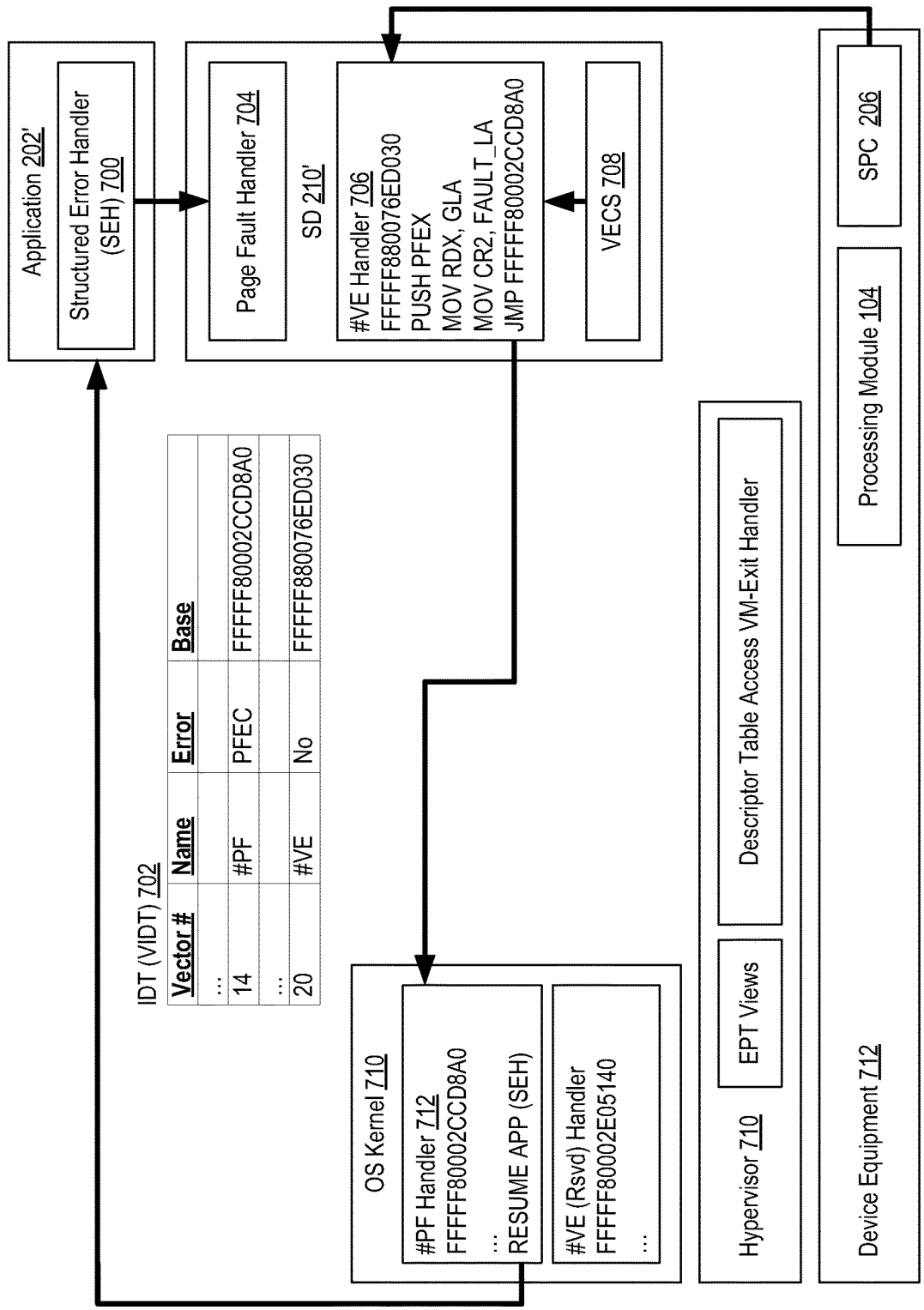
FIG. 7 illustrates an example of virtual exception handling in accordance with at least one embodiment of the present disclosure.

FIG. 7 illustrates an example of virtual exception handling in accordance with at least one embodiment of the present disclosure. In order to handle #VEs generated by access to EPT mappings in LAM 208'marked as not present, the SGX driver has to hook the #VE vector in IDT of OS 200 on all hardware threads. This is normally accomplished by replacing the address of the #VE handler in IDT with a new address. However, IDTs are system data structures that the Windows PatchGuard protects. SD 210' cannot modify the original IDTs, so instead it has to create new ones. SD 210' may execute the SIDT instruction on all hardware threads to retrieve the values from IDT register (IDTR) including addresses where IDTs are located. SD 210' may then makes copies of the original IDTs replacing the address of the original #VE handler with the address of the driver's own #VE handler. SD 210' may then execute the LIDT on all hardware cores with the addresses of the new IDTs. The values in IDTRs are also checked periodically by the Patch-Guard utility and, if they are changed, PatchGuard will initiate the bug check process. This can be remedied by virtualizing IDTRs in the hypervisor. The hypervisor can enable VM-exits on access to any descriptor table register whenever LGDT, LIDT, LLDT, LTR, SGDT, SIDT, SLDT, and STR are executed. The hypervisor may then return the original value of the table register instead of its current contents. The hypervisor may then enable another VMCALL that SD 210' may utilize to pass the values of the original descriptor table registers, which the hypervisor supplies whenever SGDT or SIDT are executed. Hooking the IDT in this manner is sometimes called generating a Virtual IDT or VIDT 702. VIDT 702 is not generally necessary to any embodiment consistent with the present disclosure, and thus, may be employed on an as-needed basis depending on, for example, OS 200 (e.g., Windows OS with PatchGuard enabled).

When a #VE is generated by processing module 104, it writes the information associated with the exception to a special data structure called a Virtualization-Exception Information Area (#VE Info). The information may comprise four 64-bit values: current EPTP, error code, GLA, and GPA. #VEs may be enabled by writing the address of the #VE Info to a field in the guest VMCS. Since only the hypervisor can edit the guest VMCS, SD 210' may use VMCALL to pass the address of #VE Info for each processor core in processing module 104. SD 210' and the hypervisor may then use a special structure called VE control structure or VECS 708 to communicate via the VMCALL instruction. The hypervisor allocates one page for VECS 708 that SD 210' discovers using a new leaf in CPUID 0x12. VECS 708 may be divided between all hardware cores and it may store the #VE Info and the descriptor table registers for each core. The hypervisor writes the #VE Info address to the guest VMCS to enable #VEs. In addition to reading the values in the descriptor table register area whenever SGDT or SIDT are executed, the hypervisor may also write to that area in the case OS 200 changes them by executing LGDT or LIDT. Since VECS 708 contains information that is needed to handle #VEs, it may reside in memory that is not paged by the kernel. A fault inside a fault handler would lead to a double fault, which is normally handled by the kernel.

Exceptions and interrupts are normally handled by OS 200 in a manner that is proprietary and often not documented. Thus, the #VE handler in SD 210' cannot rely on any kernel API. For example, the only thing that SD 210' may do in its #VE handler may be limited to somehow passing the information from #VE Info to the kernel itself for the appropriate handling. Since #VEs have the same semantics as #PFs, converting #VEs to #PFs and passing them to the kernel is a possible solution. One difference between #VEs and #PFs is that when #VEs are generated, a processor in processing module 104 does not push an error code onto the stack as done in case of #PFs. Also, since #VEs are described by four values instead of two in case of #PFs, control register CR2 is not used to write GLA. As described above, converting EPT violations to #PFs in the hypervisor proved not to be an effective solution. GLA→GPA mappings identified by the information provided in #PF error code (PFEC) and the CR2 register were valid as far as OS 200 was concerned, and thus, such #PFs were ignored by OS 200 as spurious. So converting a #VE into the corresponding #PF using the same GLA as reported in the #VE Info may also fail.

To resolve this issue, SD 210' may employ a special FAULT_LA that it reserves for each enclave before ECRE-ATE is executed. It may be, for example, a LA within the address space of application 202' but is outside of the secure address space of secure resources 204. Since this LA is not mapped to any VA or SP, access through it would normally cause a #PF. However, OS 200 would not know how to handle the #PF and would pass it to application 202' via SEH 700. Since the CR2 control register is used to write FAULT_LA, a place to store the actual GLA is needed. Looking at SGX as an example, it turns out that the EDX register may not be available for use since it is typically used to pass arguments to some SGX instructions. Thus, SD 210' may write the actual GLA that corresponds to the GPA that caused #VE to the EDX register. The last part may then be to deliver #PFs constructed in such a way to the #PF handler in the kernel. SD 210' may then check the current value of IDTR in VECS 706, since it may have been changed by OS 200 at some point, and reads the current address of the #PF handler by retrieving it from IDT pointed by IDTR. SD 210' than jumps to that address.

FIG. 7 illustrates an example of how a #VE may be converted to a #PF and passed to OS kernel 710, then to application 202' and then back to SD 210' (e.g., from SEH 700 to page fault handler 704) for addressing the exception. Initially, a #VE may be caused by device equipment 712 (e.g., processing module 106 and/or SPC 206). The base address in vector 20 of VIDT 702 points to the #VE handler in SD 210'. The descriptor table access VM-exit handler and EPT views may be set up in hypervisor 710. When a #VE is generated by an attempt to access a PP having a mapping in LAM 208' marked as not present, #VE handler 706 in SD 210' may be executed through VIDT 702. #VE handler 706 may retrieve #VE Info VECS 708, push the error code on the stack, write GLA into EDX, and write the special FAULT_LA for the enclave to which the faulting page belongs into EDX. SD 210' then inspects VECS 708 for the latest value of IDTR and retrieves the address of #PF handler 712 in kernel 710 from IDT and transfers the control to #PF kernel 712. #PF handler 712 doesn't ignore the #PF since FAULT_LA is not mapped to any physical memory. However, it can't handle it either because the address was never mapped to any physical memory that may have been paged out. Kernel 710 may then forward the fault to application 202' through SEH 700. The existing SEH 700 in application 202' would normally forward the fault to SD 210' by calling the #PF IOCTL. However, the faulting GLA has been stored located in EDX. The #PF IOCTL may then be changed so SEH 700 can pass both values from the exception information structure provided by the kernel: the GLA from CR2 and the value from EDX. SD 210' may then handle the fault, for example, by evicting a victim page and paging in the required target page while updating the EPT mappings for LAM 208' accordingly.

Figure 8:
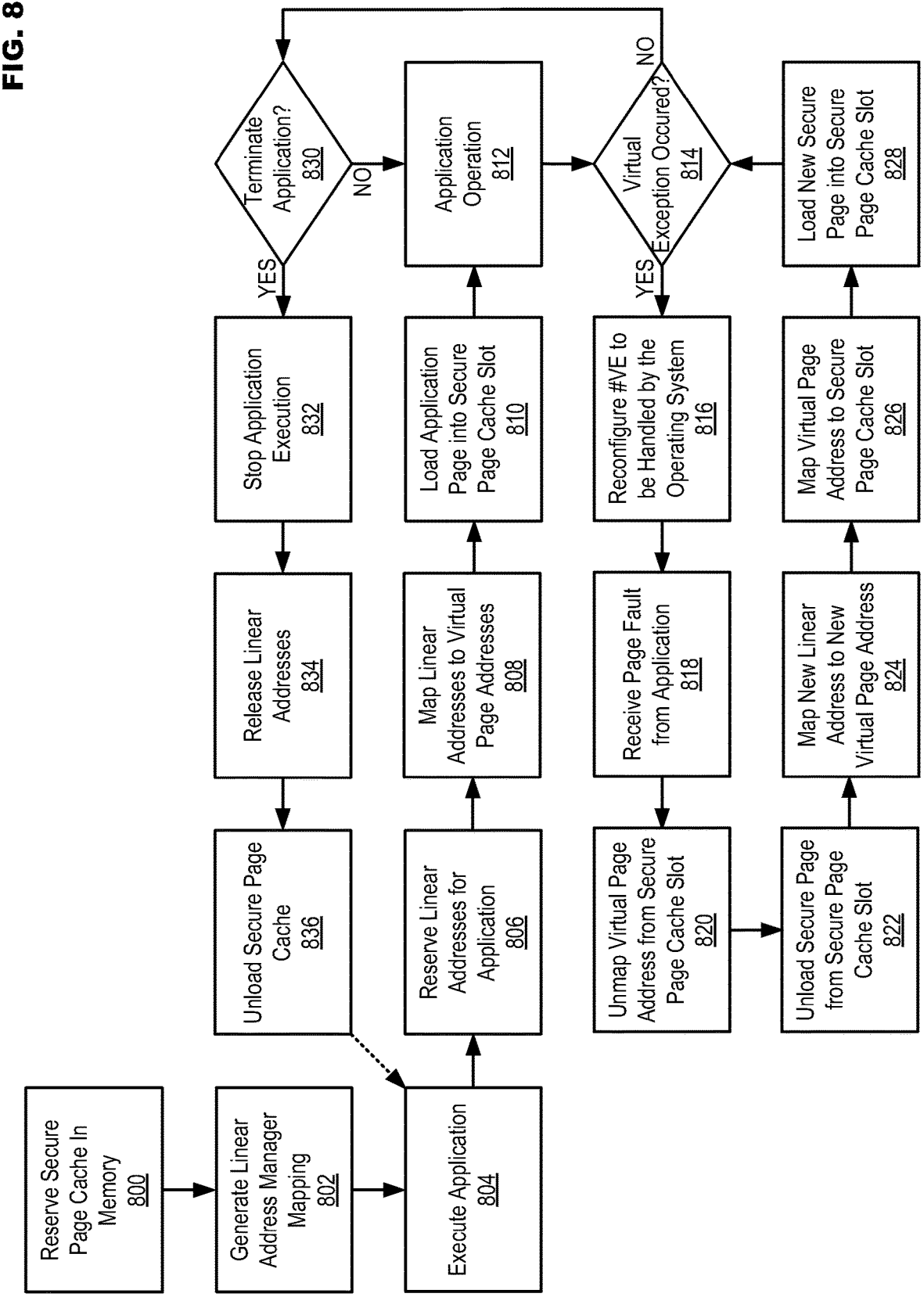
FIG. 8 illustrates example operations for employing intermediary structures for facilitating access to secure memory in accordance with at least one embodiment of the present disclosure.

FIG. 8 illustrates example operations for employing intermediary structures for facilitating access to secure memory in accordance with at least one embodiment of the present disclosure. The example operations disclosed in FIG. 8 may be from the perspective of a secure driver operating in a device. In operation 800 a secure page cache may be reserved in memory (e.g., in a memory module of a device). A linear address manager mapping (e.g., mapping pseudo page addresses to secure page slots) may be generated in operation 802, and may be followed by the execution of an application in operation 804. In operation 806 linear addresses in an application page table may be reserved, and may be mapped to corresponding pseudo page addresses in the linear address manager in operation 808. Application pages may then be loaded into secure page cache slots in operation 810, the application pages becoming secure pages upon loading.

The application may begin normal operation in operation 812. A determination may then be made in operation 814 as to whether a virtual exception has occurred. If it is determined in operation 814 that a virtual exception has occurred, then in operation 816 the virtual exception may be reconfigured for handling by the operating system. In operation 818 a page fault (e.g., corresponding to the virtual exception) may be received from the application, triggering the secure driver to begin operations to resolve the problem (e.g., to evict a victim secure page from the secure page cache and to load a target application page in the slot of the evicted victim page). These operations may include, for example, unmapping at least one pseudo page address from a secure page cache slot (e.g., corresponding to the victim page) in operation 820. In operation 822 the victim page may be unloaded from its secure page cache slot, followed by mapping a new linear address (e.g., corresponding to the target page to be loaded) to a new pseudo page address in operation 824. The new pseudo page address may then be mapped to the available secure page cache slot in operation 826, and a new application page (corresponding to the linear address mapped in operation 824) may be loaded into the available secure page cache slot in operation 828. Operation 828 may be followed by operation 814 to detect further exceptions.

If in operation 814 it is determined that a virtual exception has not occurred, then the application may continue normal operation in operation 830 until a determination is made in operation 830 that the application is ready to (e.g., or needs to) terminate. In operation 832 the application may stop execution. The linear addresses associated with the application may be released in operation 834, followed by the secure page cache being unloaded from memory in operation 836. Operation 836 may optionally be followed by a return to operation 804 wherein a new application may be loaded. Operations 806-836 may then proceed as previously described.

While FIG. 8 illustrates operations according to an embodiment, it is to be understood that not all of the operations depicted in FIG. 8 are necessary for other embodiments. Indeed, it is fully contemplated herein that in other embodiments of the present disclosure, the operations depicted in FIG. 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to employing intermediary structures for facilitating access to secure memory. A secure driver (SD) may be loaded into the device to reserve a least a section of memory in the device as a secure page cache (SPC). The SPC may protect application data from being accessed by other active applications in the device. Potential race conditions may be avoided through the use of a linear address manager (LAM) that maps linear addresses (LAs) in an application page table (PT) to page slots in the SPC. The SD may also facilitate error handling in the device by reconfiguring VEs that would otherwise be ignored by the OS.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for employing intermediary structures for facilitating access to secure memory, as provided below.

According to example 1 there is provided a device configured to employ intermediary structures for facilitating access to secure memory. The device may comprise a processing module and a memory module, including at least a firmware module to cause a secure driver to be loaded into the memory module, the secure driver being to cause at least one section of memory in the memory module to be reserved as a secure page cache including at least one secure page slot and generate a linear address manager mapping at least one pseudo page address in the linear address manager to the at least one secure page slot.

Example 2 may include the elements of example 1, wherein the memory module further includes an operating system in which applications execute, the execution of at least one application in the operating system causing data to be loaded into the secure page cache from elsewhere in the memory module.

Example 3 may include the elements of example 2, wherein the application comprises at least one page table including at least one linear address reserved by the secure driver for mapping to the at least one pseudo page address in the linear address manager.

Example 4 may include the elements of example 3, wherein the secure driver is further to release a linear address reserved by the secure driver for reassignment, map the linear address to a pseudo page address in the linear address manager and load an application page from the application into a secure page slot mapped to the pseudo page address, the application page becoming a secure page upon loading.

Example 5 may include the elements of example 4, wherein the secure driver is further to determine that a secure page loaded in a secure page slot is to be evicted from the secure page cache based at least on the receipt of a page fault, cause a pseudo page address corresponding to the secure page to be unmapped from the secure page slot in which the secure page is loaded and cause the secure page to be unloaded from the secure page slot.

Example 6 may include the elements of example 5, wherein the secure driver is further to cause a new application page to be loaded into the secure page slot, cause a new pseudo page address to be mapped to the secure page slot and cause a new linear address to be mapped to the new pseudo page address.

Example 7 may include the elements of example 4, wherein the secure driver is further to determine that a secure page loaded in a secure page slot is to be evicted from the secure page cache based at least on the receipt of a page fault, cause a pseudo page address corresponding to the secure page to be unmapped from the secure page slot in which the secure page is loaded, cause the secure page to be unloaded from the secure page slot, cause a new application page to be loaded into the secure page slot, cause a new pseudo page address to be mapped to the secure page slot and cause a new linear address to be mapped to the new pseudo page address.

Example 8 may include the elements of example 7, wherein the linear address manager is at least to avoid a race condition wherein a reserved linear address is reassigned to another program thread when a secure page is evicted from the secure page cache.

Example 9 may include the elements of any of examples 1 to 8, wherein the secure driver is further to receive a virtual exception due to a page fault occurring in the secure page cache, reconfigure the virtual exception to be handled by the operating system and provide the reconfigured virtual exception to an operating system kernel.

Example 10 may include the elements of example 9, wherein the secure driver being to reconfigure the virtual exception comprises the secure driver being to push an error code on to an operating system call stack and write a linear address indicating that the virtual exception has occurred to a control register of the processing module to cause an operating system error handler to react to the virtual exception, the linear address indicating the virtual exception being within an address space of an application that caused the exception and outside of a secure address space within the memory module.

Example 11 may include the elements of example 10, wherein the secure driver is further to write a linear address that caused the virtual exception to a register in the secure address space.

Example 12 may include the elements of example 9, wherein the secure driver being to reconfigure the virtual exception comprises the secure driver being to push an error code on to an operating system call stack, write a linear address indicating that the virtual exception has occurred to a control register of the processing module to cause an operating system error handler to react to the virtual exception, the linear address indicating the virtual exception being within an address space of an application that caused the exception and outside of a secure address space within the memory module and write a linear address that caused the virtual exception to a register in the secure address space.

Example 13 may include the elements of example 12, wherein the secure driver is further to receive a page fault from a structured error handler in an application and resolve the virtual exception based on the reception of the page fault.

Example 14 may include the elements of any of examples 1 to 8, wherein the secure driver is a Secure Guard Extensions (SGX) driver and the secure page cache is an SGX enclave page cache.

According to example 15 there is provided a method for employing intermediary structures for facilitating access to secure memory. The method may comprise causing at least one section of memory to be reserved as a secure page cache including at least one secure page slot and generating a linear address manager mapping at least one pseudo page address in the linear address manager to the at least one secure page slot.

Example 16 may include the elements of example 15, and may further comprise executing an application including at least one page table having at least one linear address reserved for mapping to the at least one pseudo page address in the linear address manager and causing data to be loaded into the secure page cache from elsewhere in memory based on executing the application.

Example 17 may include the elements of example 16, wherein causing data to be loaded into the secure page cache comprises releasing a reserved linear address for reassignment, mapping the linear address to a pseudo page address in the linear address manager and loading an application page from the application into a secure page slot mapped to the pseudo page address, the application page becoming a secure page upon loading.

Example 18 may include the elements of example 17, and may further comprise determining that a secure page loaded in a secure page slot is to be evicted from the secure page cache based at least on the receipt of a page fault, causing a pseudo page address corresponding to the secure page to be unmapped from the secure page slot in which the secure page is loaded; and causing the secure page to be unloaded from the secure page slot.

Example 19 may include the elements of example 18, and may further comprise causing a new application page to be loaded into the secure page slot, causing a new pseudo page address to be mapped to the secure page slot and causing new linear address to be mapped to the new pseudo page address.

Example 20 may include the elements of example 17, and may further comprise determining that a secure page loaded in a secure page slot is to be evicted from the secure page cache based at least on the receipt of a page fault, causing a pseudo page address corresponding to the secure page to be unmapped from the secure page slot in which the secure page is loaded, causing the secure page to be unloaded from the secure page slot, causing a new application page to be loaded into the secure page slot, causing a new pseudo page address to be mapped to the secure page slot and causing new linear address to be mapped to the new pseudo page address.

Example 21 may include the elements of example 20, wherein the linear address manager is at least to avoid a race condition wherein a reserved linear address is reassigned to another program thread when a secure page is evicted from the secure page cache.

Example 22 may include the elements of any of examples 15 to 21, and may further comprise receiving a virtual exception due to a page fault occurring in the secure page cache, reconfiguring the virtual exception to be handled by the operating system and providing the reconfigured virtual exception to an operating system kernel.

Example 23 may include the elements of example 22, wherein reconfiguring the virtual exception comprises pushing an error code on to an operating system call stack and writing a linear address indicating that the virtual exception has occurred to a control register of a processing module to cause an operating system error handler to react to the virtual exception, the linear address indicating the virtual exception being within an address space of an application that caused the exception and outside of a secure address space within the memory module.

Example 24 may include the elements of example 23, and may further comprise writing a linear address that caused the virtual exception to a register in the secure address space.

Example 25 may include the elements of example 22, wherein reconfiguring the virtual exception may comprise pushing an error code on to an operating system call stack, writing a linear address indicating that the virtual exception has occurred to a control register of a processing module to cause an operating system error handler to react to the virtual exception, the linear address indicating the virtual exception being within an address space of an application that caused the exception and outside of a secure address space within the memory module and writing a linear address that caused the virtual exception to a register in the secure address space.

Example 26 may include the elements of example 25, and may further comprise receiving a page fault from a structured error handler in an application and resolving the virtual exception based on the reception of the page fault.

Example 27 may include the elements of any of examples 15 to 21, wherein the secure page cache is a Secure Guard Extensions (SGX) enclave page cache.

According to example 28 there is provided a system including at least a device, the system being arranged to perform the method of any of the above examples 15 to 27.

According to example 29 there is provided a chipset arranged to perform the method of any of the above examples 15 to 27.

According to example 30 there is provided at least one machine readable medium comprising a plurality of instructions that, in response to be being executed on a computing device, cause the computing device to carry out the method according to any of the above examples 15 to 27.

According to example 31 there is provided a device configured for employing intermediary structures for facilitating access to secure memory, the device being arranged to perform the method of any of the above examples 15 to 27.

According to example 32 there is provided a system for employing intermediary structures for facilitating access to secure memory. The system may comprise means for causing at least one section of memory to be reserved as a secure page cache including at least one secure page slot and means for generating a linear address manager mapping at least one pseudo page address in the linear address manager to the at least one secure page slot.

Example 33 may include the elements of example 32, and may further comprise means for executing an application including at least one page table having at least one linear address reserved for mapping to the at least one pseudo page address in the linear address manager and means for causing data to be loaded into the secure page cache from elsewhere in memory based on executing the application.

Example 34 may include the elements of example 33, wherein the means for causing data to be loaded into the secure page cache may comprise means for releasing a reserved linear address reserved for reassignment, means for mapping the linear address to a pseudo page address in the linear address manager and means for loading an application page from the application into a secure page slot mapped to the pseudo page address, the application page becoming a secure page upon loading.

Example 35 may include the elements of example 34, and may further comprise means for determining that a secure page loaded in a secure page slot is to be evicted from the secure page cache based at least on the receipt of a page fault, means for causing a pseudo page address corresponding to the secure page to be unmapped from the secure page slot in which the secure page is loaded and means for causing the secure page to be unloaded from the secure page slot.

Example 36 may include the elements of example 35, and may further comprise means for causing a new application page to be loaded into the secure page slot, means for causing a new pseudo page address to be mapped to the secure page slot and means for causing new linear address to be mapped to the new pseudo page address.

Example 37 may include the elements of any of examples 31 to 36, and may further comprise means for receiving a virtual exception due to a page fault occurring in the secure page cache, means for reconfiguring the virtual exception to be handled by the operating system and means for providing the reconfigured virtual exception to an operating system kernel.

Example 38 may include the elements of example 37, wherein the means for reconfiguring the virtual exception may comprise means for pushing an error code on to an operating system call stack and means for writing a linear address indicating that the virtual exception has occurred to a control register of a processing module to cause an operating system error handler to react to the virtual exception, the linear address indicating the virtual exception being within an address space of an application that caused the exception and outside of a secure address space within the memory module.

Example 39 may include the elements of example 38, and may further comprise means for writing a linear address that caused a virtual exception to a register in the secure address space.

Example 40 may include the elements of any of examples 31 to 36, wherein the secure page cache is a Secure Guard Extensions (SGX) enclave page cache.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A device configured to employ intermediary structures for facilitating access to secure memory, comprising:
   memory including an application, an operating system, firmware, and secure resources, wherein the firmware causes a secure driver to be loaded into the memory, wherein the secure driver is configured to:
     facilitate communication between the application and the secure resources;
     cause at least one section of the secure resources to be reserved as a secure page cache including at least one secure page slot; and
     generate a linear address manager mapping that maps at least one pseudo page address in a linear address manager to the at least one secure page slot, wherein the linear address manager is included in the secure resources,
   wherein to facilitate communication between the application and the secure resources includes to convert a virtual exception to a page fault that is passed to an operating system (OS) kernel, to the application, and to the secure driver.

2. The device of claim 1, wherein the application is configured to execute in the operating system, so as to cause data to be loaded into the secure page cache from elsewhere in the memory.

3. The device of claim 2, wherein the application comprises at least one page table including at least one linear address reserved by the secure driver for mapping to the at least one pseudo page address in the linear address manager.

4. The device of claim 3, wherein the secure driver is further to:
   release a linear address reserved by the secure driver for reassignment;
   map the linear address to a pseudo page address in the linear address manager; and
   load an application page from the application into a secure page slot mapped to the pseudo page address, the application page becoming a secure page upon loading.

5. The device of claim 4, wherein the secure driver is further to:
   determine that a secure page loaded in a secure page slot is to be evicted from the secure page cache based at least on the receipt of the page fault;
   cause a pseudo page address corresponding to the secure page to be unmapped from the secure page slot in which the secure page is loaded; and
   cause the secure page to be unloaded from the secure page slot.

6. The device of claim 5, wherein the secure driver is further to:
   cause a new application page to be loaded into the secure page slot;
   cause a new pseudo page address to be mapped to the secure page slot; and
   cause a new linear address to be mapped to the new pseudo page address.

7. The device of claim 1, wherein the secure driver is further to write a linear address that caused the virtual exception to a register in the secure address space.

8. A method for employing intermediary structures for facilitating access to secure memory, comprising:
   causing, with firmware of a device, a secure driver to be loaded into memory of the device, the memory including an application, an operating system, the firmware, and secure resources, wherein the secure driver is configured to facilitate communication between the application and the secure resources;
   causing, with said firmware, at least one section of memory to be reserved as a secure page cache including at least one secure page slot; and
   generating, with said firmware, a linear address manager mapping that maps at least one pseudo page address in a linear address manager to the at least one secure page slot, wherein the secure page cache and the linear address manager are included in the secure resources,
   wherein to facilitate communication between the application and the secure resources includes converting a virtual exception to a page fault that is passed to an operating system (OS) kernel, to the application, and to the secure driver.

9. The method of claim 8, further comprising:
   executing the application within the operating system, the application including at least one page table having at least one linear address reserved for mapping to the at least one pseudo page address in the linear address manager; and
   causing data to be loaded into the secure page cache from elsewhere in the memory based on executing the application.

10. The method of claim 9, wherein causing data to be loaded into the secure page cache comprises:
    releasing a reserved linear address for reassignment;
    mapping the linear address to a pseudo page address in the linear address manager; and
    loading an application page from the application into a secure page slot mapped to the pseudo page address, the application page becoming a secure page upon loading.

11. The method of claim 10, further comprising:
    determining that a secure page loaded in a secure page slot is to be evicted from the secure page cache based at least on the receipt of the page fault;
    causing a pseudo page address corresponding to the secure page to be unmapped from the secure page slot in which the secure page is loaded; and
    causing the secure page to be unloaded from the secure page slot.

12. The method of claim 11, further comprising:
    causing a new application page to be loaded into the secure page slot;
    causing a new pseudo page address to be mapped to the secure page slot; and
    causing a new linear address to be mapped to the new pseudo page address.

13. The method of claim 8, further comprising: writing a linear address that caused the virtual exception to a register in the secure address space.

14. At least one non-transitory computer readable storage medium having stored thereon, individually or in combination, instructions that when executed by one or more processors result in the following operations for employing intermediary structures for facilitating access to secure memory, comprising:

causing, with firmware of a device, a secure driver to be loaded into memory of said device, the memory including an application, an operating system, the firmware, and secure resources, wherein the secure driver is configured to facilitate communication between the application and the secure resources;

causing, with said firmware, at least one section of memory to be reserved as a secure page cache including at least one secure page slot; and generating, with said firmware, a linear address manager mapping that maps at least one pseudo page address in a linear address manager to the at least one secure page slot, wherein the secure page cache and the linear address manager are included in the secure resources, wherein to facilitate communication between the application and the secure resources includes to convert a virtual exception to a page fault that is passed to an operating system (OS) kernel, to the application, and to the secure driver.

15. The medium of claim 14, further comprising instructions that when executed by one or more processors result in the following operations, comprising:

executing the application within the operating system, the application including at least one page table having at least one linear address reserved for mapping to the at least one pseudo page address in the linear address manager; and causing data to be loaded into the secure page cache from elsewhere in memory based on executing the application.

16. The medium of claim 15, wherein the instructions for causing data to be loaded into the secure page cache comprise instructions that when executed by one or more processors result in the following operations, comprising:

releasing a reserved linear address for reassignment;

mapping the linear address to a pseudo page address in the linear address manager; and loading an application page from the application into a secure page slot mapped to the pseudo page address, the application page becoming a secure page upon loading.

17. The medium of claim 16, further comprising instructions that when executed by one or more processors result in the following operations, comprising:

determining that a secure page loaded in a secure page slot is to be evicted from the secure page cache based at least on the receipt of the page fault;

causing a pseudo page address corresponding to the secure page to be unmapped from the secure page slot in which the secure page is loaded; and causing the secure page to be unloaded from the secure page slot.

18. The medium of claim 17, further comprising instructions that when executed by one or more processors result in the following operations, comprising:

causing a new application page to be loaded into the secure page slot;

causing a new pseudo page address to be mapped to the secure page slot; and causing a new linear address to be mapped to the new pseudo page address.

19. The medium of claim 14, further comprising instructions that when executed by one or more processors result in the following operations, comprising: writing a linear address that caused the virtual exception to a register in the secure address space.

\* \* \* \* \*